United States Patent
Zander et al.

(10) Patent No.: US 9,088,309 B2
(45) Date of Patent: Jul. 21, 2015

(54) ANTENNA TUNNING ARRANGEMENT AND METHOD

(75) Inventors: Olof Zander, Lund (SE); Ulf Thomas Bolin, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 53 days.

(21) Appl. No.: 13/809,218

(22) PCT Filed: Feb. 17, 2012

(86) PCT No.: PCT/EP2012/052790
§ 371 (c)(1),
(2), (4) Date: Jan. 9, 2013

(87) PCT Pub. No.: WO2013/120536
PCT Pub. Date: Aug. 22, 2013

(65) Prior Publication Data
US 2013/0231066 A1    Sep. 5, 2013

(51) Int. Cl.
*H04M 1/00* (2006.01)
*H04B 7/02* (2006.01)
*H01Q 1/24* (2006.01)
(Continued)

(52) U.S. Cl.
CPC .................. *H04B 7/02* (2013.01); *H01Q 1/242* (2013.01); *H01Q 3/24* (2013.01); *H01Q 3/26* (2013.01); *H01Q 21/28* (2013.01); *H01Q 25/00* (2013.01); *H04B 7/0617* (2013.01)

(58) Field of Classification Search
CPC ....... H01Q 1/243; H01Q 1/242; H01Q 1/244; H01Q 1/084; H04B 1/3833; H04B 1/40; H04B 1/44; H04B 1/54; H04B 1/406; H04B 1/38; H04B 1/30

USPC ............. 455/77, 120, 121, 123, 550.1, 575.1, 455/575.7
See application file for complete search history.

(56) References Cited

U.S. PATENT DOCUMENTS 8,626,083 B2 * 1/2014 Greene et al. ................... 455/77
8,738,071 B2 * 5/2014 Wohld ........................ 455/550.1
(Continued)

FOREIGN PATENT DOCUMENTS

EP  0 883 206 A2  12/1998
EP  2 388 925 A1  11/2011
(Continued)

OTHER PUBLICATIONS

International Search Report, corresponding to PCT/EP2012/052790, mailed Nov. 7, 2012.
(Continued)

*Primary Examiner* — Nhan Le
(74) *Attorney, Agent, or Firm* — Renner, Otto, Boisselle & Sklar, LLP

(57) ABSTRACT

The present invention relates to a method and a mobile communication terminal comprising a communication interface having an antenna arrangement, an arrangement for providing a geographical position of the terminal, a memory and a controller. The controller is configured to adjust transmission parameters of said antenna arrangement with respect to a geographical position of the mobile communication terminal with respect to a geographical position data received from said arrangement for providing a geographical position of the mobile communication terminal.

15 Claims, 4 Drawing Sheets

(51) Int. Cl.
*H01Q 3/24* (2006.01)
*H01Q 3/26* (2006.01)
*H01Q 21/28* (2006.01)
*H01Q 25/00* (2006.01)
*H04B 7/06* (2006.01)

(56) References Cited

U.S. PATENT DOCUMENTS

2004/0017310 A1* 1/2004 Vargas-Hurlston et al. .......................... 342/357.1
2008/0268865 A1 10/2008 Tung
2008/0318625 A1* 12/2008 Rofougaran ............... 455/556.1
2010/0329378 A1* 12/2010 Leung ........................... 375/267

FOREIGN PATENT DOCUMENTS

| GB | 2 433 859 A | 7/2007 |
| WO | 98/16077 A2 | 4/1998 |
| WO | 01/13530 A1 | 2/2001 |

OTHER PUBLICATIONS

Written Opinion, corresponding to PCT/EP2012/052790, mailed Nov. 7, 2012.

* cited by examiner

ANTENNA TUNNING ARRANGEMENT AND METHOD

TECHNICAL FIELD

The present invention relates to wireless devices in general and tuning transmission parameters of the antenna(s) of the wireless devices in particular.

BACKGROUND

The development of mobile communication devices is getting faster. With the vigorous development of the wireless wide area network (WWAN) and long term evolution (LTE) techniques, people have higher and higher expectations of mobile communication devices. Because many countries and regions adopt different types of communication systems, there are numerous wireless network systems in the market, such as LTE700/2300/2500, GSM850/900/1800/1900 and UMTS (Universal Mobile Telecommunications System). Therefore, a mobile communication device needs not only to be light, thin and compact, but also to cover multiband operations. The problem may be solved by for example, a mobile communication device being designed to utilize a coupling-feed technique so that its internal antenna achieves the characteristics of multiband operations. In addition to the mobile telephone communication networks, the communication device may also communicate with wireless networks (Wi-Fi), such as Wireless Local Area Network (WLAN), etc.

However, with the progress of communication technology, more and more operating bands are applied in communications, such that the mobile communication device needs to cover a wider and wider operating bandwidth and be able to roam between different communication frequencies.

Thus, a mobile terminal needs to handle and support increased number of frequency bands. The primary and secondary antenna when diversity or multiband antenna such as Multiple Input Multiple Output (MIMO) is used must also cope with the increased number of frequency bands. Besides, the requirement from the operators and users on the design of the terminal, especially in term of size, leads to smaller space for allocation the antenna. Designing good antenna demands implementation of some sort of antenna tuning. The antenna tuning may be implemented as an open loop tuning or as a closed loop tuning. Closed loop tuning is measuring the radio channel or use-case and tunes the antenna in a suitable way.

Due to increased complexity of modern communication networks, especially mobile phone network systems, the coexistence of multiple frequency bands and standards (e.g. 2G/3G/4g etc.) at least in the dense populated areas and the introduction of means for channel adoption in 3G (High Speed Downlink Packet Access (HSPA)) and 4G (LTE) using MIMO technology the demand for improved processing power in the terminal will drastically increase with higher power consumption as a consequence. Processing power is needed when initializing calls, e.g. for channels scans, roaming between networks, rake receiver parameter settings etc. These procedures may also represent some time consumption, which will delay the access to the network for end user.

SUMMARY

Therefore, it is necessary to provide a multiband mobile communication device and antenna thereof to overcome the deficiency encountered by the prior art techniques.

For these reasons a communication terminal comprises a communication interface having an antenna arrangement, an arrangement for providing a position of the terminal, a memory and a controller. The controller is configured to adjust transmission parameters of said antenna arrangement with respect to a geographical position. The communication terminal may further comprise a motion sensor for providing motion and movement direction parameters. The communication device further comprises radio communication transceiver, rake receiver, antenna switch, beam steering unit and antenna tuner. The transmission parameter comprises one or several of antenna tuner band/channel, antenna tuner impedance, rake receiver operating parameters or beam direction settings. In one embodiment the positioning is satellite based and in another embodiment the position is obtained from a communication network. In one embodiment the antenna arrangement is one of MIMO (multiple-input and multiple-output), MISO (multiple-input and single-output), SISO (single-input and single-output) or SIMO (single-input and multiple-output). In another embodiment the antenna arrangement is an array antenna.

The antenna tuner may be an open-loop or closed loop tuner.

In yet another embodiment the controller is configured to adjust transmission parameters of said antenna arrangement with respect to a geographical position of the mobile communication terminal and a geographical position of a base station antenna with respect to a geographical position data received from said arrangement for providing a geographical position of the mobile communication terminal.

In yet another embodiment the controller is configured to adjust transmission parameters of said antenna arrangement with respect to earlier communication quality parameters.

The invention also relates to a method of enhancing a transmission of a mobile communication device. The method comprises: positioning said device, and adjusting transmission parameters of antenna arrangement of the device with respect to the geographical position. In one embodiment the method may further comprise using a number of environmental conditions for said adjustment. In one embodiment parameters are pre-set. In one embodiment, in lack of data for a specific position the device is configured to try a number of parameters to find a parameter setting providing optimal antenna setting. The parameter settings providing optimal antenna setting are stored for later use.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

In the following description, for purposes of explanation and not limitation, specific details are set forth, such as particular components, elements, techniques, etc. in order to provide a thorough understanding of the example embodiments presented herein. However, it will be apparent to one skilled in the art that the example embodiments may be practiced in other manners that depart from these specific details. In other instances, detailed descriptions of well-known methods and elements are omitted so as not to obscure the description of the example embodiments.

Example embodiments presented herein are directed towards communication terminals having ability to communicate in different frequency bands. Embodiments presented herein may be utilized in any communication device.

Basically, the present invention provides for utilizing geographical position and physical orientation of the communication terminal together with, e.g. geographical data for base stations' positions, network system and channels, to process and predetermine at least terminal RF-parameters and antenna tuner settings faster, thus providing faster parameter settings and saving power source lifetime.

Thus, the intention of antenna tuning is to make the antenna couple to the radio channel in the most efficient way, which is dependent on channel and channel variation, amongst others. The method of calculating the substantially best antenna matching therefore may differ between the behaviors of the channel (channel variations).

Basically, the idea is to use one or several of:
Using location based information to choose from a number of calculation methods for calculating the optimal RF-parameter and antenna matching;
Using information about movement pattern of the communication terminal for determining which calculation method is used. The information may be obtained from a positioning arrangement such as positioning, e.g. GPS, Cell ID (micro/pico cell) or motion detectors in the terminal, e.g. accelerometer, gyro, etc.;
Based on the aforementioned information, controlling the antenna radiation lobe towards the base station (pre-beam steering);
String location data with respect to best RF-parameter and antenna tuner settings and obtaining a self-teaching system for continuous channel adaption environments.

Figure 1:
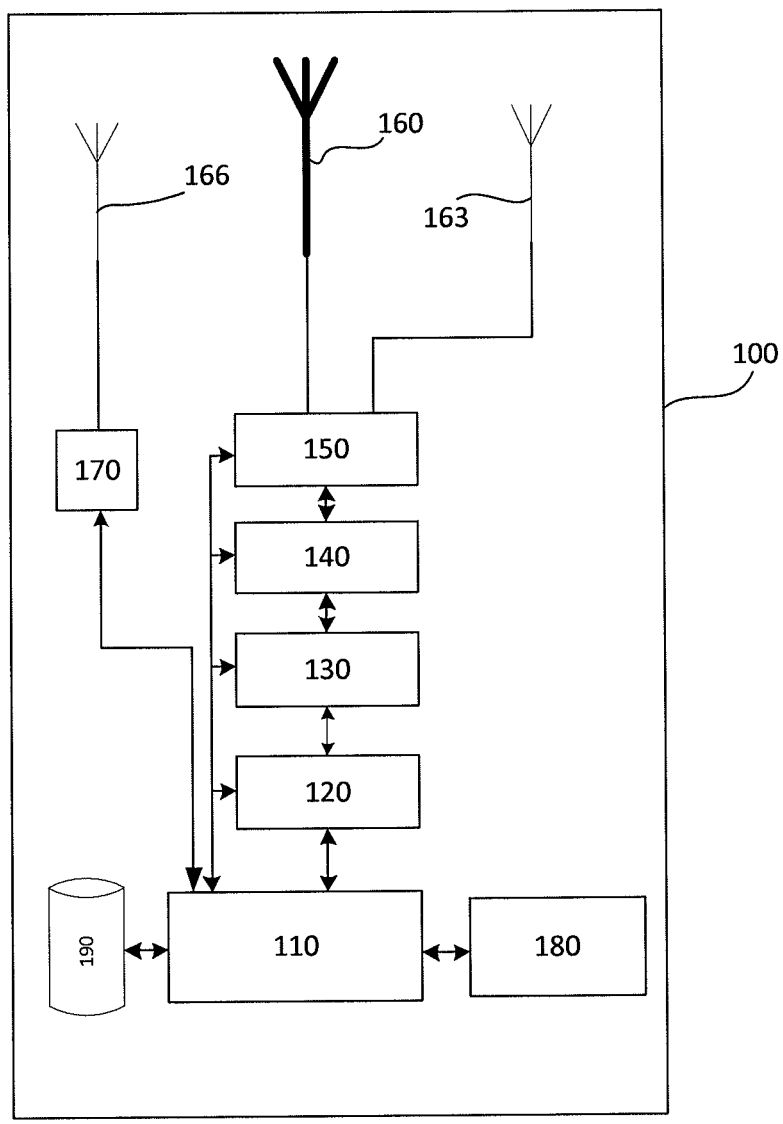
FIG. 1 is an illustrative example employing a first example embodiment.

FIG. 1 illustrates an exemplary embodiment of communication terminal, such as a mobile phone 100, which may comprise a controller 110, radio communication transceiver(s) 120, Rake receiver 130, antenna switch 140, antenna tuner 150, main antenna 160, sub antenna 163, satellite positioning antenna 166, a satellite positioning module 170, a motion sensor(s) 180 and memory 190.

The controller 110 is configured to control various function of the device 100. Control software may be stored in the memory 190. The memory 190 may also store data related to different applications and functionality, such as position and antenna tuning. Memory 190 may include a random access memory (RAM) or another dynamic storage device that stores information and instructions for execution by controller/processor 110. Memory 190 may also be used to store temporary variables or other intermediate information during execution of instructions by the controller.

The radio communication transceiver 120 controls radio communication between the mobile phone and a communication network (not shown) using antennas 160 and 163. The transceiver 120 may be Global System for Mobile Communications/Enhanced Data Rates for GSM Evolution (GSM/EDGE), Wideband Code Division Multiple Access (WCDMA), etc. transceivers. The antennas 160 and 163 may be a part of a MIMO (multiple-input and multiple-output), MISO (multiple-input and single-output), SISO (single-input and single-output), SIMO (single-input and multiple-output) type antenna configuration.

The rake receiver 130 counters the effects of multipath fading, by using several co-relators each assigned to a different multipath component.

The antenna switch 140, for switching between the antennas selects an antenna whose reception level is high, and selects an antenna with good antenna characteristics depending on a function during the communication.

The antenna tuner 150, which may be an open-loop or closed-loop tuner in which the system may use, e.g. dynamic impedance tuning techniques to optimize the antenna performance.

In the open-loop antenna tuning system, in one embodiment, a tunable element fine-tunes the performance of the antenna at set frequency bands and modes of operation, and it can also take into account information regarding transmit/receive frequencies, modulation scheme, or use case (e.g. slide open or closed). This information may be stored in a lookup table, e.g. in the memory 190, in the baseband memory, and adapted to provide optimal performance with respect to the position/environmental condition of the device.

The closed-loop antenna tuning can be used, where the controller provides constant feedback by tracking the operation of the antenna and the environmental parameters, as will be described below. Additionally, a mismatch sensor may monitor the power that is reflected back to the antenna, which is measured as the antenna's voltage standing wave ratio (VSWR). The sensor then compares the amplitude of this reflected power to the transmit power and makes an adjustment to the impedance tuning circuitry, allowing the closed-loop antenna tuner to track the optimal frequency and matching for the antenna in all use cases.

The satellite positioning portion comprises an antenna 166 and a positioning module 170. The positioning system may rely upon Global Positioning System (GPS) or any other positioning. The positioning module 170 may be configured to obtain location of the phone and destination locations, e.g., fixed geographic locations. Geographic data for the location of the GPS phone and for the location of the destination may be obtained from a geographic database available, for example, stored in the device, on the service provider server or Internet. Another approach may include a network based method that determines a position of the wireless phone devices by measuring angle of arrival (AOA) and time of arrival (TOA) of the wireless phone devices' signals at multiple fixed base stations. Yet another approach includes Assisted GPS (AGPS), which is a system in which outside sources, such as an assistance server (Mobile Location Server), are used to help the GPS via a network.

The motion sensor 180 may comprise an accelerometer and/or a gyro, and provides the controller with information about the phones motion (movement, direction, velocity, etc.).

Figure 2:
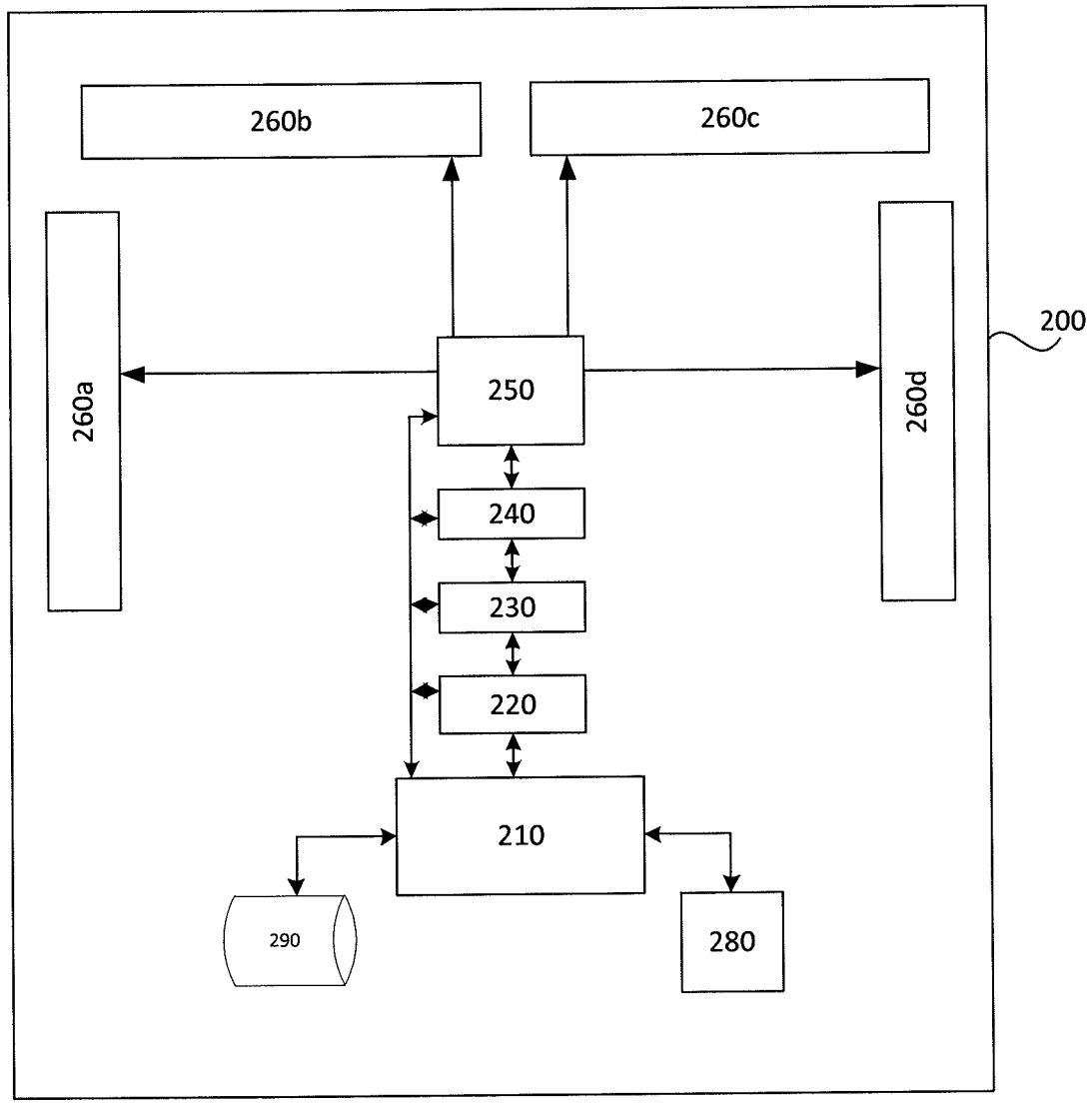
FIG. 2 is an illustrative example employing a second example embodiment.

FIG. 2 illustrates an exemplary embodiment of another device, such as a PDA 200. The PDA 200 may comprise a controller 210, radio communication transceiver(s) 220, rake receiver 230, beam steering circuit 240, antenna tuner 250, antenna array comprising antennas 260a-260d, motion sensor(s) 280 and memory 290.

The controller 210 is configured to control various functions of the device 200. Control software may be stored in the memory 290. The memory 290 may also store data related to different applications and functionality, such as position and antenna tuning.

The radio communication transceiver 220 controls radio communication between the PDA 200 and a communication network (not shown) using antennas 260a-260d.

The rake receiver 230 counters the effects of multipath fading, by using several co-relators each assigned to a different multipath component.

The beam steering (or forming) circuit 240 electronically steers the beam maximum of the antenna electric field pattern to some predefined point in space.

The antenna tuner 250, which may be an open-loop or closed-loop tuner in which the system may use, e.g. dynamic impedance tuning techniques to optimize the antenna performance. The tuner function is described in conjunction with the embodiment of FIG. 1.

A network based method that determines the position of the PDA may be used to position the device, e.g. by measuring angle of arrival (AOA) and time of arrival (TOA) of the devices' signals at multiple fixed base stations. Clearly, satellite positioning may also be used to position the device.

The motion sensor 280 may comprise an accelerometer and/or a gyro, and provides the controller with information about the devices motion (movement, direction, velocity, etc.).

The exemplary devices 100 and 200 in which methods and systems described herein may be implemented, may further include a bus, additional processors and memories, a storage device, an input device, an output device, a communication interface and one or more power supplies (not shown). One skilled in the art would recognize that system may be configured in a number of other ways and may include other or different elements.

Processors may include any type of processor or microprocessor that interprets and executes instructions and also include logic that is able to decode media files and generate output to, for example, a speaker, a display, etc.

Input device may include one or more conventional mechanisms that permit a user to input information to the device, such as a keyboard, a keypad, a directional pad, a mouse, a pen, voice recognition, a touch-screen and/or biometric mechanisms, etc. Output device may include one or more conventional mechanisms that output information to the user, including a display, a printer, one or more speakers, etc.

Figure 3:
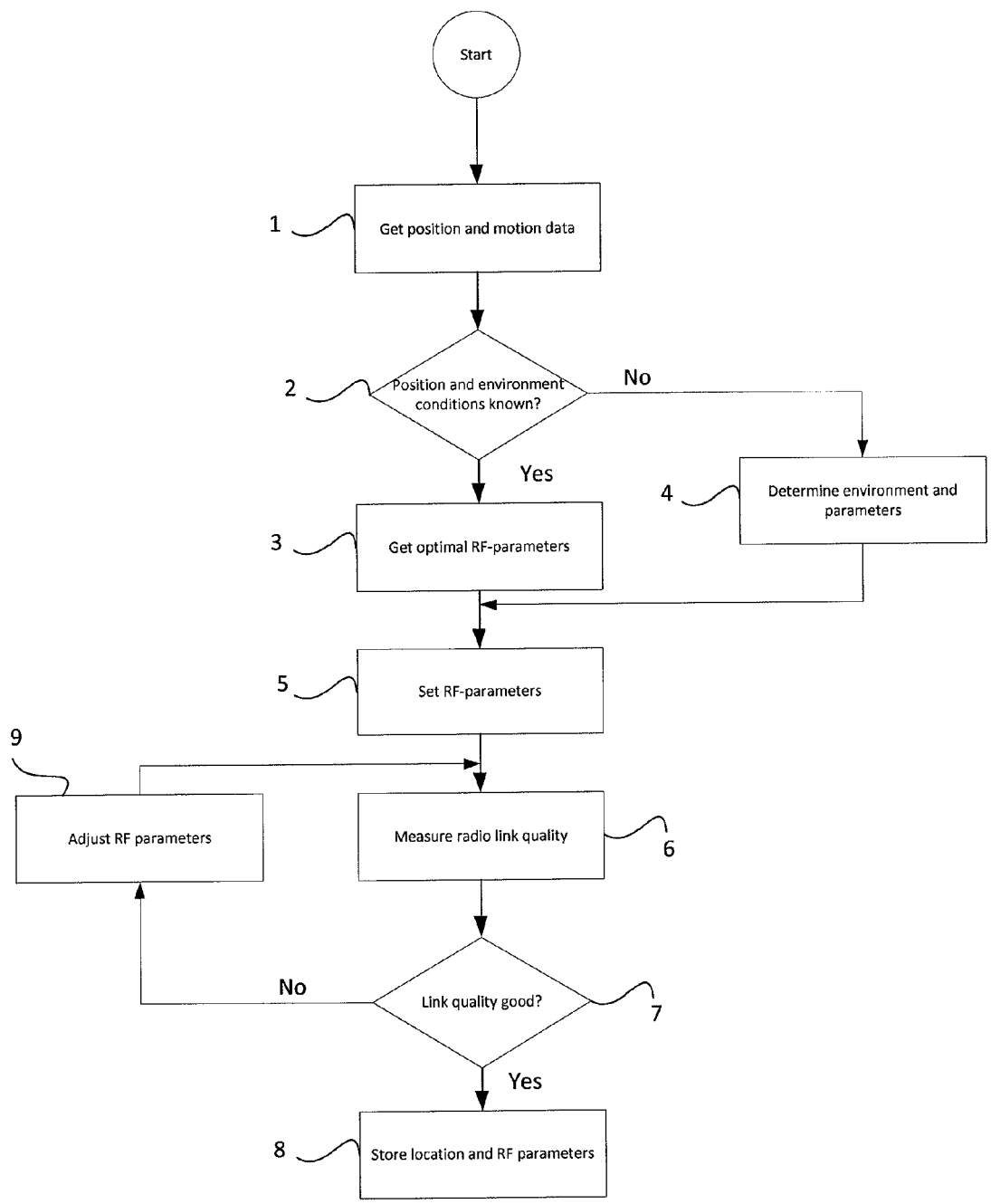
FIG. 3 is an illustrative example of a flow diagram illustrating method steps according to the present invention.
Figure 4:
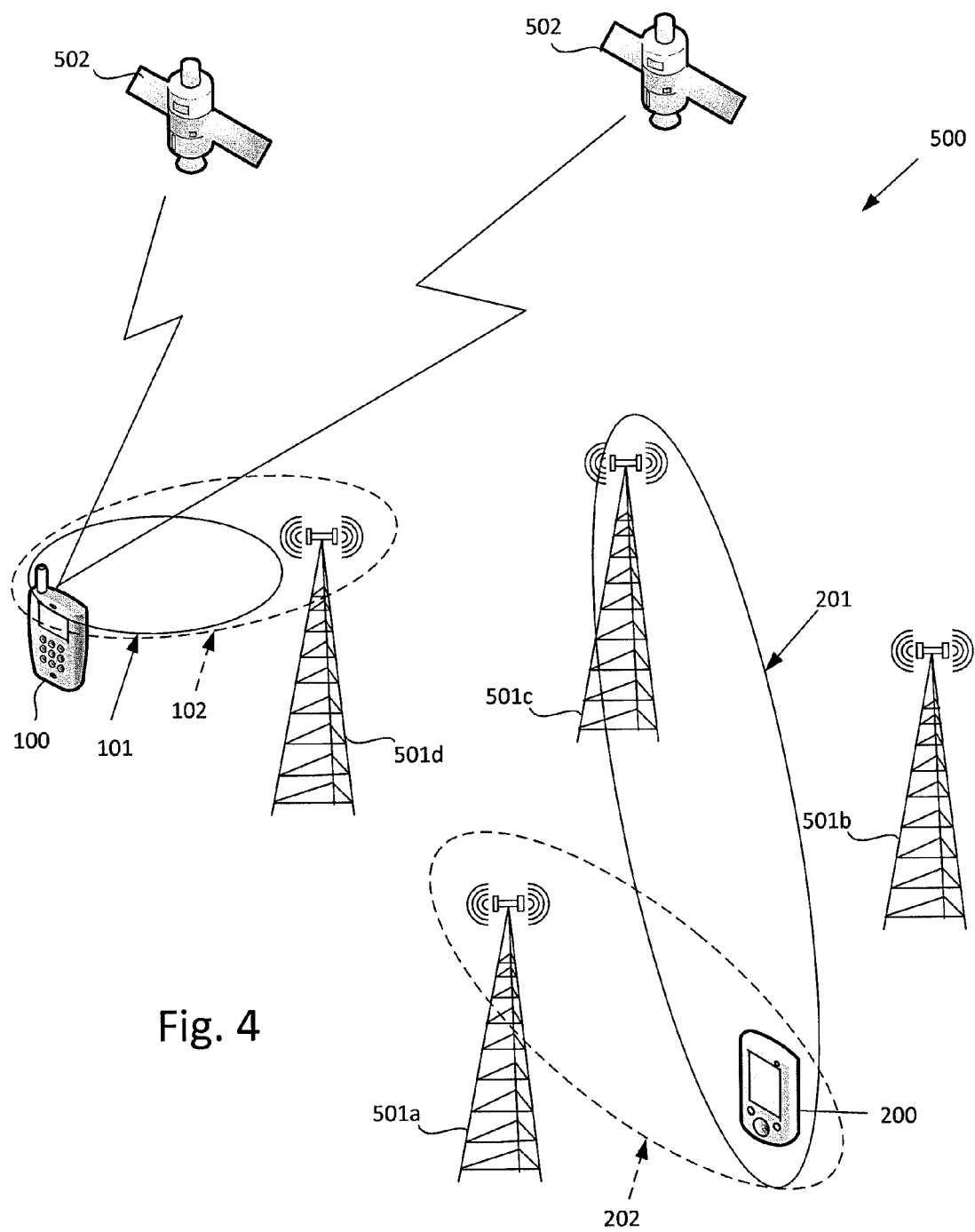
FIG. 4 illustrates schematically a communication network implementing the invention according to one embodiment.

In the following, the invention is described with reference to embodiments of FIGS. 1 and 2 and the flow diagram of FIG. 3.

The device 100, 200 initiates the operation by obtaining (1) position from the positioning module or the communication network and motion data from the motion sensor 180, 280. The position data may also include motion data, e.g. direction of movement and speed, etc. Then the position of the device is looked up in a database or a table to determine (2) whether position and environmental conditions are known (stored from earlier situations or predetermined). The environmental data may include one or several of rural, urban, indoors, base station positions etc. If the position and environmental conditions are known, RF-parameter settings stored in the memory 190, 290 and corresponding to the position are fetched (3) by the controller and set (5). The RF-parameters may be one or several of antenna tuner band/channel, antenna tuner impedance, rake receiver operating parameters, beam direction settings (when applicable).

In a rake receiver, each rake finger operates with the aid of a set of operating parameters, which determine the function of that rake finger. The set of operating parameters includes the delay time which the rake finger "sets" for the desired propagation path, that is to say it selects one of the versions of the received signal. In the case of CDMA (Code Division Multiple Access) systems, further parameters are added in order to de-spread the received spread-coded received signal versions in each rake finger. Details relating to the scrambling sequence and the spread code to be de-spread as well as details relating to the spreading factor on which it is based are signalled in parametric form to the rake finger.

If the position and environmental conditions are not known (i.e. new position) a map in the database of the network or service provider or stored in the device may be consulted (4) to determine the type of the environment and a set of RF-parameters (as listed above) for the location (and corresponding conditions) may be provided and set (5). Thus, the invention may provide a self-teaching system, where the device "learns" to adopt parameters relating to a specific position by storing the most optimal parameters.

The channel and radio link quality is measured (6) and if (7) the quality is satisfactory RF-parameter together with position data (and device motion data) are stored in the memory for later use. The parameters may also be exported to a network database for mediation to other similar devices in that position (or entering the location). If the link quality is not good the parameters are adjusted (9) until a good link quality is achieved.

FIG. 5 illustrates an exemplary communication network 500 implementing the teachings of the present invention. Two exemplary communication terminals, a mobile phone 100 and a mobile computer, such as PDA (Personal Digital Assistant) 200 are within the communication range of the network. The network comprises a number of base stations with corresponding antennas 501a, 501b, 501c and 501d. A number of satellites 502 provide satellite positioning.

The mobile phone 100, e.g. as described in conjunction with the embodiment of FIG. 1, is positioned, e.g. using GPS positioning. Normally, the mobile phone 100 transmits with, for the phone normal, transmission radiation 101 (illustrated with solid line). However, in accordance with the present invention, the distance to the closes base station tower 501a is then determined based on the position (and also other environmental conditions as described above) and pre-set parameters for channel optimization are configured, and radiation 102 is improved, e.g. using band switching, channel matching and increased power.

According to another example, the PDA 200 is positioned, e.g. using network positioning, and environmental conditions are determined. Normally, the PDA may determine to communicate with tower 501c, however, based on, e.g. earlier link quality controls, the device may receive instructions to steer RF-radiation and couple to tower 501a due to interference problems from tower 501b.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) terminal that may combine a cellular radiotelephone with data processing; a laptop; a camera (e.g., video and/or still image camera) having communication ability; and any other computation or communication device capable of transceiving, such as a personal computer, a home entertainment system, a television, etc.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What we claim is:

1. A mobile communication terminal comprising a communication interface having an antenna arrangement, an arrangement for providing a geographical position of the terminal, a memory and a controller, wherein said controller is configured to adjust transmission parameters of said antenna arrangement with respect to a geographical position of the mobile communication terminal with respect to a geographical position data received from said arrangement for providing a geographical position of the mobile communication terminal; and further comprising a motion sensor for determining a movement of the mobile communication terminal, wherein said controller further is configured to adjust transmission parameters of the antenna arrangement based on the movement of the mobile communication terminal as detected by the motion sensor.

2. The communication terminal of claim 1, further comprising radio communication transceiver, rake receiver, antenna switch, beam steering unit and an antenna tuner.

3. The communication terminal according to claim 2, wherein said antenna tuner is open-loop or closed loop tuner.

4. The communication terminal of claim 1, wherein said transmission parameter comprises one or several of antenna tuner band/channel, antenna tuner impedance, rake receiver operating parameters or beam direction settings.

5. The communication terminal of claim 1, wherein said positioning is satellite based.

6. The communication terminal of claim 1, wherein said position is obtained from a communication network.

7. The communication terminal according to claim 1, wherein said antenna arrangement is one of MIMO (multiple-input and multiple-output), MISO (multiple-input and single-output), SISO (single-input and single-output) or SIMO (single-input and multiple-output).

8. The communication terminal according to claim 1, wherein said antenna arrangement is an array antenna.

9. The communication terminal of claim 1, wherein said controller is configured to adjust transmission parameters of said antenna arrangement with respect to a geographical position of the mobile communication terminal and a geographical position of a base station antenna with respect to a geographical position data received from said arrangement for providing a geographical position of the mobile communication terminal.

10. The communication terminal of claim 1, wherein said controller is configured to adjust transmission parameters of said antenna arrangement with respect to earlier communication quality parameters.

11. A method of enhancing a transmission of a mobile communication terminal, the method comprising:

determining a geographical position of said device, determining a movement of the mobile communication device with a motion sensor, and adjusting transmission parameters of antenna arrangement of the device with respect to the geographical position, and with respect to the movement of the mobile communication device as detected by the motion sensor.

12. The method of claim 11, further comprising using a number of environmental conditions for said adjustment.

13. The method of claim 11, wherein said parameters are pre-set.

14. The method according to claim 11, wherein in lack of data for a specific position the terminal is configured to try a number of parameters to find a parameter setting providing optimal antenna setting.

15. The method of claim 14, wherein said parameter setting providing optimal antenna setting are stored for a later use.

* * * * *